No. 753,166. PATENTED FEB. 23, 1904.
T. J. RYAN.
FARM GATE.
APPLICATION FILED FEB. 24, 1903.
NO MODEL. 2 SHEETS—SHEET 2.
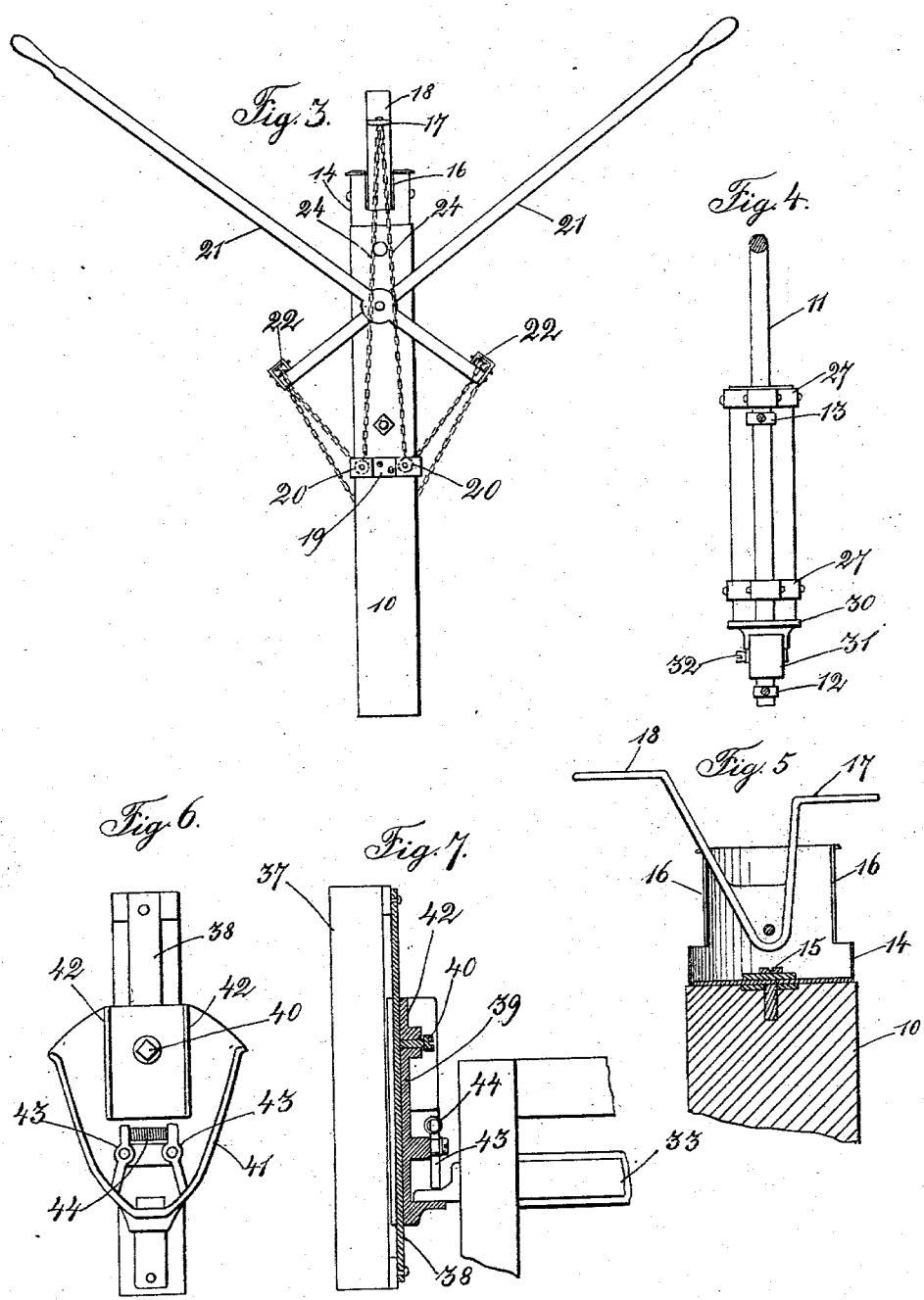
Witnesses:
Henry Manger.
L. H. Orwig.
Inventor: Timothy J. Ryan,
by Orwig & Lane Attys.

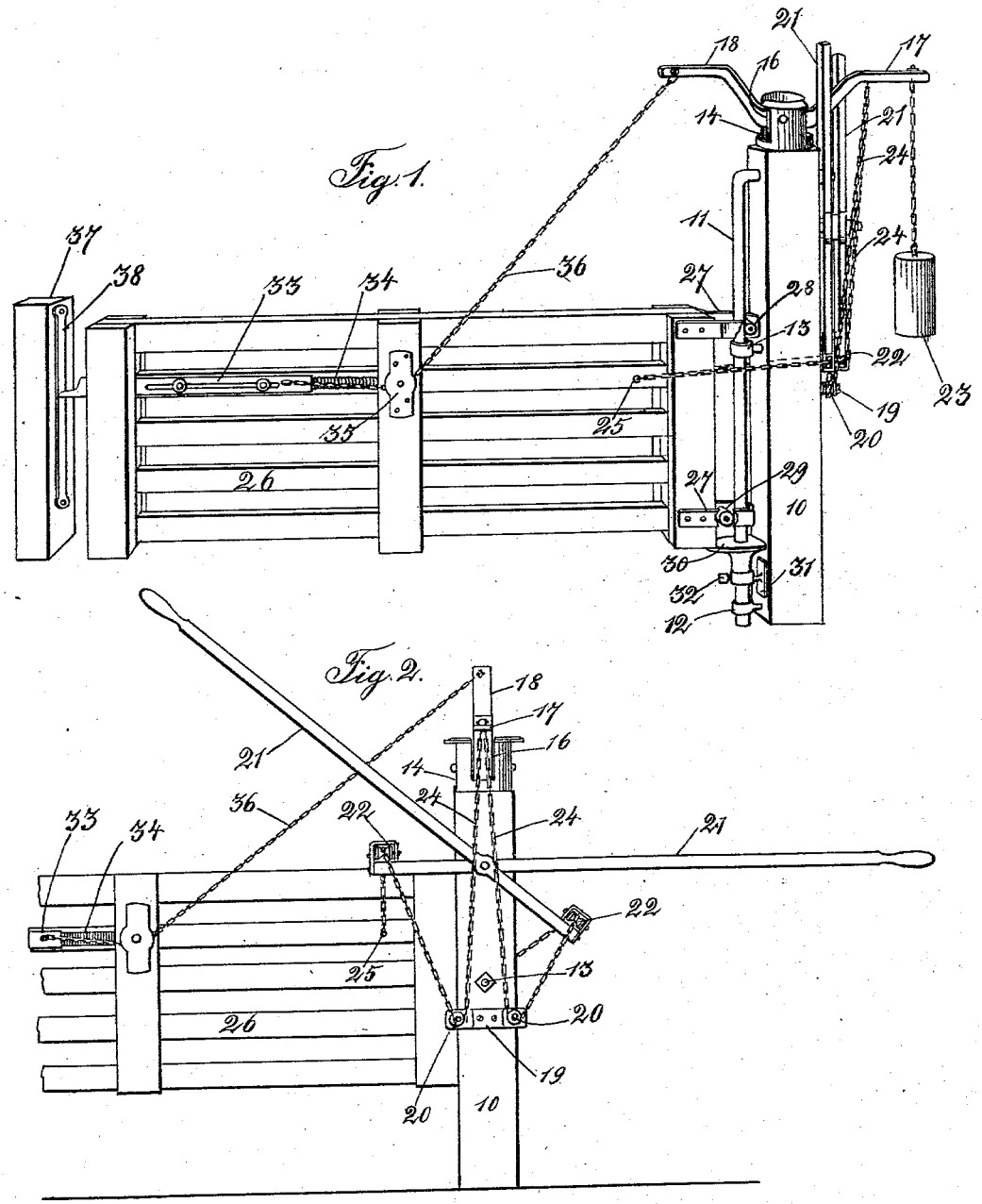

No. 753,166. Patented February 23, 1904.

UNITED STATES PATENT OFFICE.

TIMOTHY J. RYAN, OF DES MOINES, IOWA.

FARM-GATE.

SPECIFICATION forming part of Letters Patent No. 753,166, dated February 23, 1904.

Application filed February 24, 1903. Serial No. 144,920. (No model.)

*To all whom it may concern:*

Be it known that I, TIMOTHY J. RYAN, a citizen of the United States, residing at Des Moines, in the county of Polk and State of Iowa, have invented certain new and useful Improvements in Farm-Gates, of which the following is a specification.

The objects of my invention are broadly to provide a farm-gate capable of bodily movement vertically and to provide means whereby a person upon approaching the gate may pull upon a lever with the effect that first the gate will be bodily elevated to a predetermined distance and will swing outwardly to an open position in a direction away from the operator and when in its open position it will move downwardly and rest upon the ground surface, so that it will remain in its open position until closed by the operator pulling downwardly upon the lever on the opposite side of the gate.

A further object is to provide a gate-latch adapted for operation in connection with the said gate.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the complete gate in its closed position, the outer ends of the operating-levers being broken away. Fig. 2 shows a rear end elevation of the gate-post with the gate in its open position, part of the outer end of the gate being broken away. Fig. 3 shows a rear end elevation of the gate-post and the operating-levers attached thereto and shown in the position they would assume when the gate is closed. Fig. 4 shows an end view of the gate and attached parts as they would appear looking from the gate-post toward the gate. Fig. 5 shows an enlarged detailed sectional view illustrating the rotary cylinder at the top of the gate-post. Fig. 6 shows a front or face view of the post to which the gate latches and showing my improved latch applied thereto; and Fig. 7 shows a vertical central sectional view through the parts shown in Fig. 6, showing also a portion of a gate bearing a slide-bolt to be engaged by the latch.

Referring to the accompanying drawings, I have used the reference-numeral 10 to indicate the gate-post, which is of ordinary size and shape. Attached to the face of said gate-post nearest to the gate-opening in the fence is an upright rod or pipe 11, with its lower end portion connected with the gate-post by means of the bracket 12 and the upper end of the rod or pipe 11 turned downwardly and fixed to the post. This rod or pipe is also connected at its central portion to the post by means of the bracket 13. At the top of the post is an upright cylinder 14, rotatably mounted on the post and held in position by means of the central screw 15. This cylinder is open at its top and slotted at its front and rear sides, said slots being indicated by the numeral 16. Supported in this cylinder is a lever 16$^a$, having an upwardly and rearwardly projecting arm 17 and an upwardly and forwardly projecting arm 18, the function of which will be hereinafter made clear. On the outer face of the post 10, near its central portion, is a bracket 19, in which the pulleys 20 are mounted. Fulcrumed to the outer face of the post, between the bracket 19 and the top of the post, are two levers 21. These levers in their normal position are crossed at substantially right angles to each other, as shown in Fig. 3, and on the shorter end of each lever is a pulley 22. Mounted upon the end 17 of the lever 16$^a$ is a weight 23, and fixed to the same end of the lever are two chains extending downwardly and under the pulleys 20 in the bracket 19 and then over the pulleys 22 in the ends of the levers 21 and finally attached at 25 to the gate. The operation of this feature of the invention will be made clear hereinafter.

The reference-numeral 26 is used to indicate the farm-gate proper. At one end of this gate are the straps 27, the upper one of which has a roller 28, which engages the outer surface of the rod or pipe 11, and the lower strap 27 has a roller 29, that engages the inner face of the rod or pipe 11, and the numeral 30 indicates a platform adjustably supported on the rod or pipe 11 and upon which the corner-post of the gate may rest. This platform 30 is made adjustable by means of a collar 31, mounted on the rod or pipe beneath the platform and provided with a set-screw 32. Said collar has a flat extension 31ª, resting against the post 10.

Obviously the downward limit of movement of the gate is regulated by an adjustment of the platform 30, and the hinged end of the gate is prevented from sagging because its corner-post is supported upon said platform when at rest. Mounted upon the gate is a sliding bolt 33, normally held with its end projecting beyond the gate by means of the extensile coil-spring 34.

The numeral 35 indicates a pulley mounted upon the central upright of the gate, and 36 indicates a chain attached to the end 18 of the lever 16ª on top of the gate-post, passing under the roller 35, and attached to the slide-bolt 33. In practical operation with this part of the invention and assuming that the operator pulls downwardly upon one of the levers 21 obviously the first effect of this downward pull will be to lower the end 17 of the lever 16ª and raise the end 18, because of the pull upon the chains 24. This will have the effect of first withdrawing the slide-bolt 33 and then of bodily elevating the gate. When the lever 21 has been moved a certain distance, the pulley 22 at its end will be in a plane above the point of attachment of the chain 24 to the gate, and this will also help to elevate the gate; but n addition to elevating the gate it will pull the gate laterally toward the side opposite from the lever being acted on. In other words, the tendency of the gate will be to rise and move away from the operator, and it is obvious that my gate will pass over snow or any other obstruction upon the ground, and when it reaches its limit of movement and the pressure upon the lever has been removed the gate will drop to a position resting upon the ground, and when the operator has passed through the gate he need only pull the other lever downwardly and the gate will be first elevated and then moved laterally toward its closed position. Obviously by means of the weight 23 the gate is always counterbalanced, and hence very slight pressure upon the lever 21 will accomplish the desired result of opening or closing the gate. Furthermore, it does not matter at what particular point of elevation the gate is set when in its closed position, as the levers 21 will assume proper relation relative thereto at all times on account of the weight on their outer ends.

It will be seen that no ordinary gate-latch will be capable of use in this connection on account of the vertical movements of the gate necessary to accomplish the desired results, and hence I have provided the following latch mechanism to coact with my particular kind of gate. Mounted upon the fence-post, adjacent to the outer end of the gate 37, is an upright strap 38, and adjustably connected with this strap 38 is a frame 39, clamped to the strap by the set-screw 40, whereby the frame is made vertically adjustable upon the strap. Projecting from the face of the plate 39 nearest to the gate is a guiding-rib 41, comprising a flat horizontal portion and side portions inclined upwardly and outwardly therefrom, and above the central portion of the said guide are the two vertical guides 42, all of which may be cast integral with the plate 39. Pivoted to the central portion of the plate 39 are two latches 43, their lower ends engaging the upwardly and outwardly inclined portions of the guide 41 and their upper ends being connected by a contractile coil-spring 44; but they cannot move outwardly on account of the guide 41.

In practical use the plate 38 is set in such a position relative to the gate that when the gate swings to a closed position the slide-bolt 33 will enter between the guides 41 and 42. When the slide-bolt strikes the guide 42, the gate will drop by gravity until the slide-bolt 33 trips the latch and enters between said latches and the guide 41, and in this position the gate is securely locked against movement either laterally or vertically, and the only way to release it from the latch is to draw the slide-bolt 33 away from the plate 39, and this may be done by hand by grasping the slide-bolt 33 or when one of the levers 21 is operated the slide-bolt will be automatically withdrawn.

Having thus described my invention, what I claim, and desire to secure by Letters Patent of the United States therefor, is—

1. The combination with a gate-post, of a gate, means for supporting the gate upon the post to permit either vertical or horizontal movement of the gate, a collar pivoted to the top of the post to swing horizontally, a lever fulcrumed to said collar with its ends projecting in opposite directions, a weight on one end of the lever, a sliding latch on the gate, a chain connecting said latch with the other end of the lever, two levers fulcrumed to the gate-post, a pulley on each lever, two pulleys on the gate-post, and two chains, each having one end attached to the weighted end of the lever pivoted in said collar, then passed under one of the pulleys on the gate-post, then over one of the pulleys on one of the levers fulcrumed to the gate-post, and having the other end attached to the gate, substantially as and for the purposes stated.

2. The combination with a gate-post, of a rod or pipe attached to the gate-post and parallel therewith, a gate, straps at the corners of the gate overlapping said pipe or rod, a roller in the upper strap to engage the face of the pipe or rod nearest the post and a roller in the lower strap to engage the face of the pipe or rod farthest from the gate, an adjustable platform on the pipe or rod to support the rear post of the gate, a pivoted collar at the top of the gate-post to swing in a horizontal plane, a lever fulcrumed in said collar, a weight on one end of said lever and a chain on the other end of the lever, said chain being attached to the gate, two cross-levers fulcrumed to the gate-post and having pulleys at their inner ends, two pulleys mounted on the outer face of the gate-post and two chains attached at their upper ends to the lever on top of the post and extended downwardly and under the pulleys on the gate-post, then over the pulleys on the ends of the levers, and finally attached to the sides of the gate proper, for the purposes stated.

Des Moines, Iowa, February 13, 1902.

TIMOTHY J. RYAN.

Witnesses:
S. F. CHRISTY,
W. R. LANE.